US008362647B2

(12) United States Patent
Anderson et al.

(10) Patent No.: US 8,362,647 B2
(45) Date of Patent: Jan. 29, 2013

(54) UNINTERRUPTIBLE POWER SUPPLY SYSTEMS AND METHODS SUPPORTING HIGH-EFFICIENCY BYPASSED OPERATION WITH A VARIABLY AVAILABLE POWER SOURCE

(75) Inventors: Jason Scott Anderson, Raleigh, NC (US); Robert William Johnson, Jr., Raleigh, NC (US); George Arthur Navarro, Raleigh, NC (US)

(73) Assignee: Eaton Corporation, Cleveland, OH (US)

( * ) Notice: Subject to any disclaimer, the term of this patent is extended or adjusted under 35 U.S.C. 154(b) by 211 days.

(21) Appl. No.: 12/779,677

(22) Filed: May 13, 2010

(65) Prior Publication Data

US 2011/0278933 A1 Nov. 17, 2011

(51) Int. Cl.
*H02J 7/00* (2006.01)
*H02J 9/00* (2006.01)
(52) U.S. Cl. ............................... 307/64; 700/22
(58) Field of Classification Search .............. 307/71, 307/64–66
See application file for complete search history.

(56) References Cited

U.S. PATENT DOCUMENTS

| 5,929,538 | A | 7/1999 | O'Sullivan et al. |
| 6,134,124 | A | 10/2000 | Jungreis et al. |
| 6,847,130 | B1 | 1/2005 | Belehradek et al. |
| 6,960,843 | B2* | 11/2005 | Yamamoto ............... 307/86 |
| 7,212,421 | B2 | 5/2007 | Chandra et al. |
| 7,265,458 | B2* | 9/2007 | Edelen et al. .......... 307/65 |
| 7,411,308 | B2 | 8/2008 | Parmley |
| 7,652,393 | B2 | 1/2010 | Moth |
| 2004/0084965 | A1 | 5/2004 | Welches et al. |
| 2004/0145188 | A1 | 7/2004 | Janssen et al. |
| 2006/0290205 | A1* | 12/2006 | Heber et al. .......... 307/65 |
| 2007/0076444 | A1 | 4/2007 | McNulty et al. |
| 2008/0030027 | A1 | 2/2008 | Erdman et al. |
| 2008/0111424 | A1* | 5/2008 | Yeh ...................... 307/65 |

(Continued)

FOREIGN PATENT DOCUMENTS

| EP | 1965487 A1 | 2/2007 |
| WO | WO 2006/026549 | 3/2006 |

OTHER PUBLICATIONS

Jayasimha et al.; *Photovoltaic UPS*; IEEE TENCON 2003 Conference on Convergent Technologies for Asia-Pacific Region, vol. 4, pp. 1419-1423 (2003).

(Continued)

*Primary Examiner* — Rexford Barnie
*Assistant Examiner* — Toan Vu
(74) *Attorney, Agent, or Firm* — Myers Bigel Sibley & Sajovec, P.A.

(57) ABSTRACT

An uninterruptible power supply (UPS) system includes an AC input configured to be coupled to an AC power source, an AC output configured to be coupled to a load, a power conversion circuit comprising a first converter circuit configured to receive power from a variably available power source, a second converter circuit coupled to the AC output, a DC link coupling the first and second converter circuits, and a switching circuit, e.g., a bypass circuit, configured to selectively couple and decouple the AC input and the AC output. The UPS system further includes a control circuit operatively associated with the power conversion circuit and the switching circuit and configured to cause concurrent transfer of power to a load at the AC output from the AC power source and the variably available power source via the switching circuit and the power conversion circuit, respectively.

24 Claims, 8 Drawing Sheets

U.S. PATENT DOCUMENTS

| | | |
|---|---|---|
| 2008/0185915 A1 | 8/2008 | Wang |
| 2008/0217998 A1 | 9/2008 | Parmley |
| 2009/0009001 A1* | 1/2009 | Marwali et al. .................. 307/65 |
| 2009/0072623 A1* | 3/2009 | Liao ................................ 307/65 |
| 2009/0284074 A1 | 11/2009 | Yeh |

OTHER PUBLICATIONS

International Search Report and Written Opinion corresponding to International Application No. PCT/IB2011/001024; Date of Mailing: Jul. 5, 2012; 14 pages.

* cited by examiner

UNINTERRUPTIBLE POWER SUPPLY SYSTEMS AND METHODS SUPPORTING HIGH-EFFICIENCY BYPASSED OPERATION WITH A VARIABLY AVAILABLE POWER SOURCE

BACKGROUND

The inventive subject matter relates to power supply systems and methods and, more particularly, to uninterruptible power supply (UPS) systems and methods.

UPS systems are commonly used in installations such as data centers, medical centers and industrial facilities. UPS systems may be used in such installations to provide backup power to maintain operation in event of failure of the primary utility supply. These UPS systems common have an "on-line" configuration including a rectifier and inverter coupled by a DC link that is also coupled to an auxiliary power source, such as a battery, fuel cell or other energy storage device. In some UPS applications, a variably available renewable source, such as a photovoltaic source, may be coupled to the DC link of an on-line UPS to provide supplemental power, as described, for example, in U.S. Pat. No. 7,411,308 to Parmley and an article entitled "Photovoltaic UPS" by Jayasimha et al., IEEE TENCON 2003 Conference on Convergent Technologies for Asia-Pacific Region, vol. 4, pp. 1419-1423 (2003).

A frequent goal in such applications is to provide uninterruptible power with high efficiency. Towards this end, on-line UPSs that are used in such applications may support an "efficiency" mode in which the rectifier/inverter conversion chain is bypassed using a static switch when the utility source is within nominally acceptable bounds.

SUMMARY OF THE INVENTIVE SUBJECT MATTER

Some embodiments of the inventive subject matter provide an uninterruptible power supply (UPS) system including an AC input configured to be coupled to an AC power source, an AC output configured to be coupled to a load, a power conversion circuit including a first converter circuit configured to receive power from a variably available power source, a second converter circuit coupled to the AC output, a DC link coupling the first and second converter circuits, and a switching circuit configured to selectively couple and decouple the AC input and the AC output. The UPS system further includes a control circuit operatively associated with the power conversion circuit and the switching circuit and configured to cause concurrent transfer of power to a load at the AC output from the AC power source and the variably available power source via the switching circuit and the power conversion circuit, respectively. In some embodiments, the DC link is configured to receive power from an auxiliary power source and the control circuit is configured to support a mode of operation in which the power conversion circuit provides power to the load from the auxiliary power source responsive to a status of the AC power source.

In further embodiments, the power conversion circuit includes a first power conversion circuit, the UPS system further includes a second power conversion circuit operatively controlled by the control circuit and including an AC/DC converter coupled to the AC input, a DC/AC converter coupled to the AC output and a DC link coupling the AC/DC converter to the DC/AC converter. The switching circuit may include a bypass circuit. The control circuit may support a mode in which power is concurrently transferred to the load from the AC power source and the variably available power source via the bypass circuit and the first power conversion circuit, respectively, and a mode in which power is concurrently transferred to the load from the variably available power source and an auxiliary power source coupled to the DC link of the first power conversion circuit. The control circuit may further support a mode in which power is concurrently transferred to the load from the AC power source and the variably available power source via the second power conversion circuit and the first power conversion circuit, respectively. In some embodiments, the DC links of the first and second power conversion circuits are configured to receive power from respective auxiliary power sources, and the control circuit supports a mode in which power is concurrently transferred to the load from the variably available power source and from the auxiliary power sources.

In further embodiments, the first and second power conversion circuits are included in respective first and second power conversion modules, each of which includes a converter unit flexibly configurable to operate as a rectifier and a DC/DC converter. In some embodiments, the converter unit of the first power conversion circuit is configured to operate as a DC/DC converter.

Some embodiments of the inventive subject matter provide methods of operating a UPS system including an AC input configured to be coupled to an AC power source, an AC output configured to be coupled to a load, a power conversion circuit including a first converter configured to receive power from a variably available power source, a second converter coupled to the AC output, a DC link coupling the first and second converter circuits, a switching circuit configured to selectively couple and decouple the AC input and the AC output and a control circuit operatively associated with the power conversion circuit and the switching circuit. The methods include concurrently transferring power to a load at the AC output from the AC power source and the variably available power source via the switching circuit and the power conversion circuit, respectively.

The DC link may be configured to receive power from an auxiliary power source and the methods may further include providing power to the load from the auxiliary power source via the power conversion responsive to a status of the AC power source. The power conversion circuit may includes first power conversion circuit, the UPS system may further include a second power conversion circuit operatively controlled by the control circuit and including an AC/DC converter coupled to the AC input, a DC/AC converter coupled to the AC output and a DC link coupling the AC/DC converter to the DC/AC converter. The switching circuit may include a bypass circuit. Methods may further include concurrently transferring power to the load from the AC power source and the variably available power source via the bypass circuit and the first power conversion circuit, respectively, and concurrently transferring power to the load from the variably available power source and an auxiliary power source coupled to the DC link of the first power conversion circuit. Methods may further include concurrently transferring power to the load from the AC power source and the variably available power source via the second power conversion circuit and the first power conversion circuit, respectively. In further embodiments, the DC links of the first and second power conversion circuits may be configured to receive power from respective auxiliary power sources, and methods may further include concurrently transferring power to the load from the variably available power source and from the auxiliary power sources.

The first and second power conversion circuits may be included in respective first and second power conversion modules, each of which includes a converter unit configurable to operate as a rectifier and a DC/DC converter. The converter unit of the first power conversion circuit may be operated as DC/DC converter.

DETAILED DESCRIPTION OF EXEMPLARY EMBODIMENTS

Specific exemplary embodiments of the inventive subject matter now will be described with reference to the accompanying drawings. This inventive subject matter may, however, be embodied in many different forms and should not be construed as limited to the embodiments set forth herein; rather, these embodiments are provided so that this disclosure will be thorough and complete, and will fully convey the scope of the inventive subject matter to those skilled in the art. In the drawings, like numbers refer to like elements. It will be understood that when an element is referred to as being "connected" or "coupled" to another element, it can be directly connected or coupled to the other element or intervening elements may be present. As used herein the term "and/or" includes any and all combinations of one or more of the associated listed items.

The terminology used herein is for the purpose of describing particular embodiments only and is not intended to be limiting of the inventive subject matter. As used herein, the singular forms "a", "an" and "the" are intended to include the plural forms as well, unless expressly stated otherwise. It will be further understood that the terms "includes," "comprises," "including" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this inventive subject matter belongs. It will be further understood that terms, such as those defined in commonly used dictionaries, should be interpreted as having a meaning that is consistent with their meaning in the context of the specification and the relevant art and will not be interpreted in an idealized or overly formal sense unless expressly so defined herein.

As will be appreciated by one of skill in the art, the inventive subject matter may be embodied as systems, methods and computer program products. Some embodiments of the inventive subject matter may include hardware and/or combinations of hardware and software. Some embodiments of the inventive subject matter include circuitry configured to provide functions described herein. It will be appreciated that such circuitry may include analog circuits, digital circuits, and combinations of analog and digital circuits.

Embodiments of the inventive subject matter are described below with reference to block diagrams and/or operational illustrations of systems and methods according to various embodiments of the inventive subject matter. It will be understood that each block of the block diagrams and/or operational illustrations, and combinations of blocks in the block diagrams and/or operational illustrations, can be implemented by analog and/or digital hardware, and/or computer program instructions. These computer program instructions may be provided to a processor of a general purpose computer, special purpose computer, ASIC, and/or other programmable data processing apparatus, such that the instructions, which execute via the processor of the computer and/or other programmable data processing apparatus, create means for implementing the functions/acts specified in the block diagrams and/or operational illustrations. In some implementations, the functions/acts noted in the figures may occur out of the order noted in the block diagrams and/or operational illustrations. For example, two operations shown as occurring in succession may, in fact, be executed substantially concurrently or the operations may sometimes be executed in the reverse order, depending upon the functionality/acts involved.

Some embodiments of the inventive subject matter relate to interfacing of variably available power sources with UPSs. As referred to herein, "variably available power sources" include power sources, such as solar, wind, tidal and similar renewable energy sources, having an availability (presence and/or capacity) that fluctuates with environmental conditions (e.g., availability of wind, sun or tidal change) and that are not, as a general rule, available on demand. Such power sources may also be referred to as "variable", "intermittent" or "non-dispatchable" and, for purposes of the present application, such sources shall be referred to as "variably available power sources."

Figure 1:
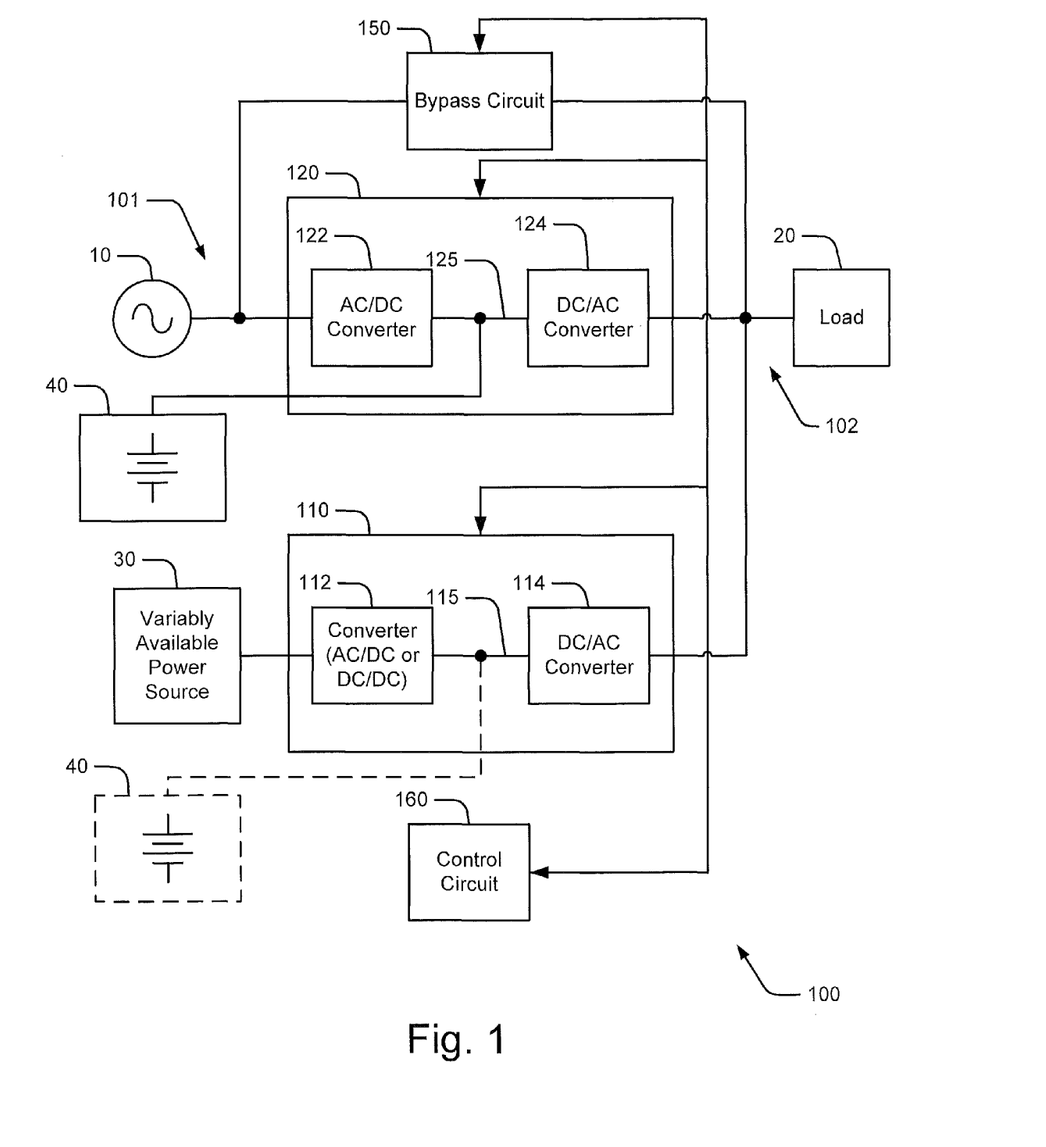
FIG. 1 is a schematic diagram illustrating a UPS system according to some embodiments of the inventive subject matter.

FIG. 1 illustrates a UPS system 100 according to some embodiments of the inventive subject matter. The UPS system 100 includes an AC input 101 configured to be coupled to an AC power source 10 and an AC output 102 configured to be coupled to a load 20. The AC power source 10 may be single or multiphase and may comprise, for example, a utility source and/or a local source, such as a generator. The load 20 may comprise, in general, one load or an aggregation of single and/or multiphase loads, such as a collection of three-phase and single phase loads that may be found in a typical data center or similar facility.

The UPS system 100 includes a first power conversion circuit 110 including a first converter circuit 112 configured to receive power from a variably available power source 30, a second converter circuit 114 coupled to the AC output 102, and a DC link 115 coupling the first and second converter circuits 112, 114. Depending on the nature of the variably available source 30, the first converter circuit 112 may operate as an AC/DC converter (a rectifier) or as a DC/DC converter.

The UPS system 100 also includes a second power conversion circuit 120 that is configured to operate as an on-line UPS. The second power conversion circuit 120 includes an AC/DC converter circuit 122 coupled to a DC/DC converter circuit 124 by a DC link 125. An auxiliary power source 40 (e.g., one or more batteries) is coupled to the DC link 125, and may supply backup power in the event of a failure of the AC power source 10. An additional auxiliary power source 40 may be coupled to the DC link 115 of the first power conversion circuit 110.

The UPS system 100 further includes a switching circuit, here shown as a bypass circuit 150 configured to selectively bypass the second conversion circuit 120 by selectively coupling and decoupling the AC input 101 and the AC output 102. A control circuit 160 is operatively associated with the first power conversion circuit 110, the second power conversion circuit 120 and the bypass circuit 150 and configured to cause concurrent transfer of power to the load 20 from the AC power source 10 and the variably available power source 30 via the bypass circuit 150 and the first power conversion circuit 110, respectively.

Figure 2:
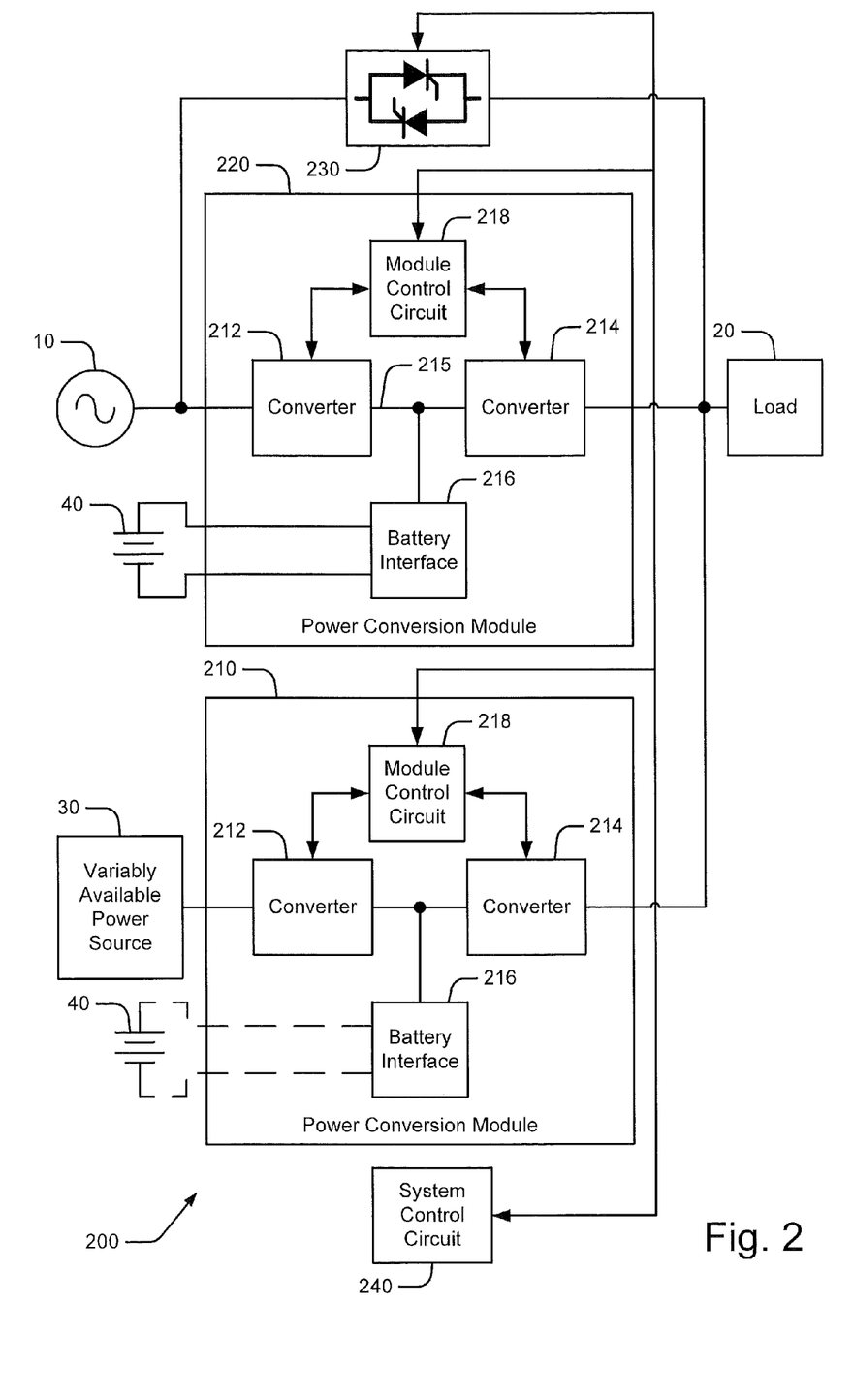
FIG. 2 is a schematic diagram illustrating a modular UPS system according to some embodiments of the inventive subject matter.

FIG. 2 illustrates a modular UPS system 200 according to further embodiments that may provide such functionality. The UPS system 200 includes first and second power conversion modules 210, 220 having a common architecture, including first and second converter units 212, 214 linked by a DC bus 215, a battery interface unit 216 for coupling a battery to the DC bus 215 and a module control unit 218. The module control units 218 may be operatively associated with a system control circuit 240 that, for example, defines interoperation of the power conversion modules 210, 220 in various operating modes as described below. The modules 210, 220 may have the same or different form factors and/or capacities. For example, the modules 210, 220 may have a common form factor and/or external connection configuration, and may be designed to be interchangeably installed in a system chassis.

The second power conversion module 220 is configured to provide on-line UPS operation, with power being selectively supplied to a load 20 from an AC power source 10 and one or more backup batteries 40. The first power conversion module 210 is configured to provide an interface for a variably available power source 30 such as a photovoltaic source or wind power generator. The first converter unit 212 of the first power conversion module 210 may be configured to provide an appropriate conversion depending on the nature of the variably available power source 30, which may be different from a conversion provided by the first converter unit 212 of the first power conversion circuit 210. For example, the first converter units 212 of the first and second power conversion modules 210, 220 may comprise respective active bridge circuits that are selectively configurable to operate as a rectifier or a DC/DC converter depending on, for example, control signals applied thereto by the module control units 218. One or more additional backup batteries may be coupled to the battery interface unit 216 of the first power conversion module 210.

Figure 3:
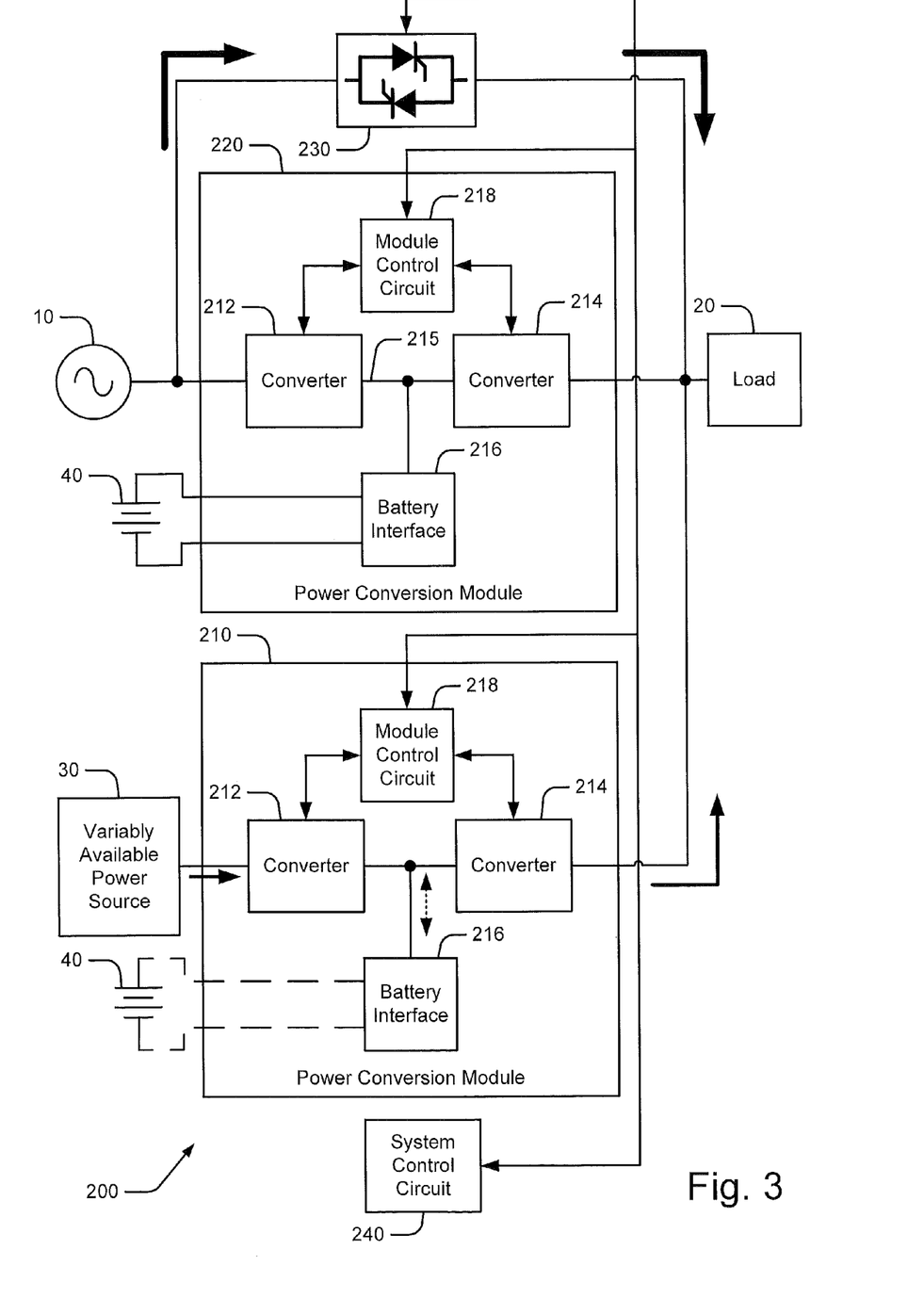
FIGS. 3-5 are schematic diagrams illustrating operations of the UPS system of FIG. 2.
Figure 4:
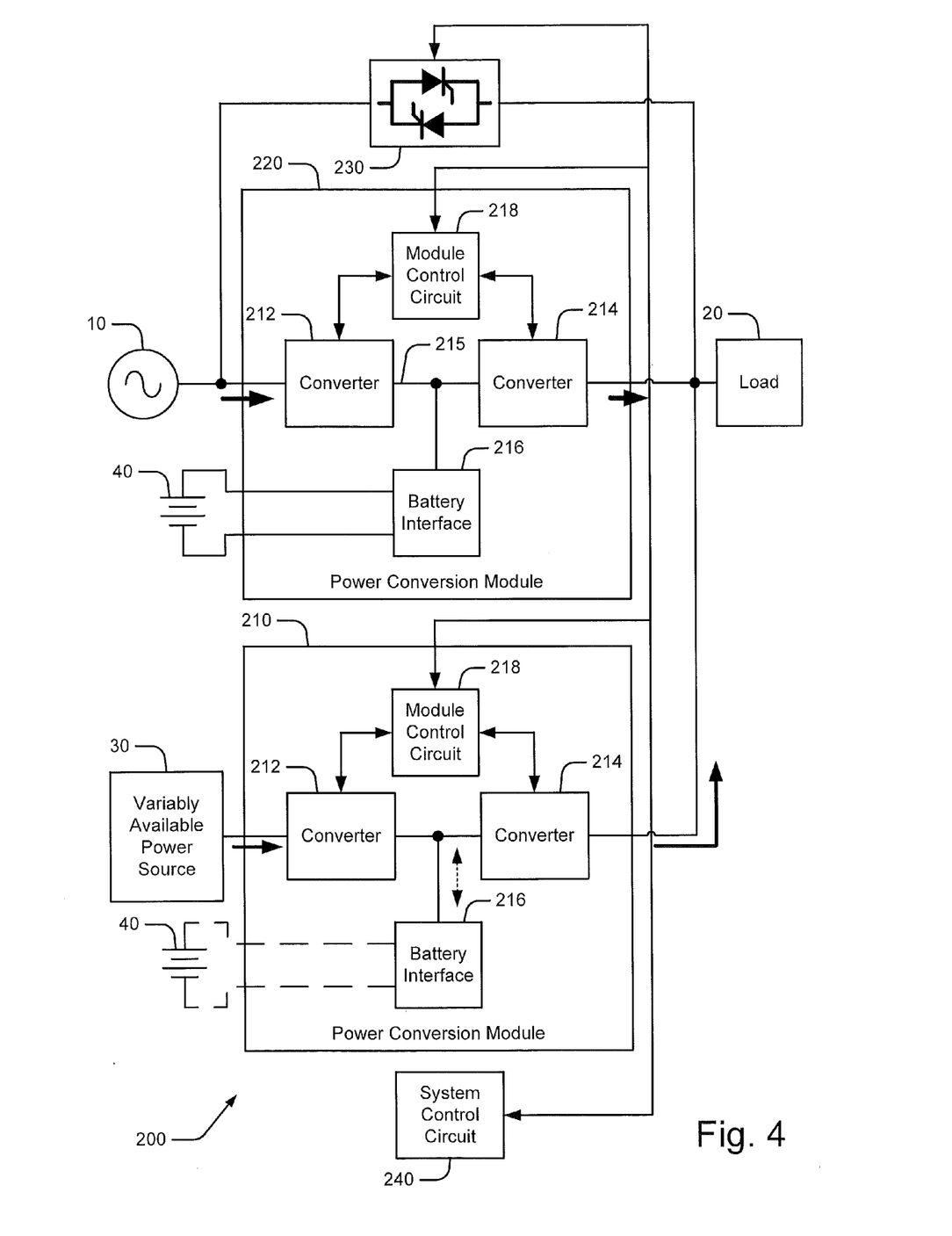
Figure 5:
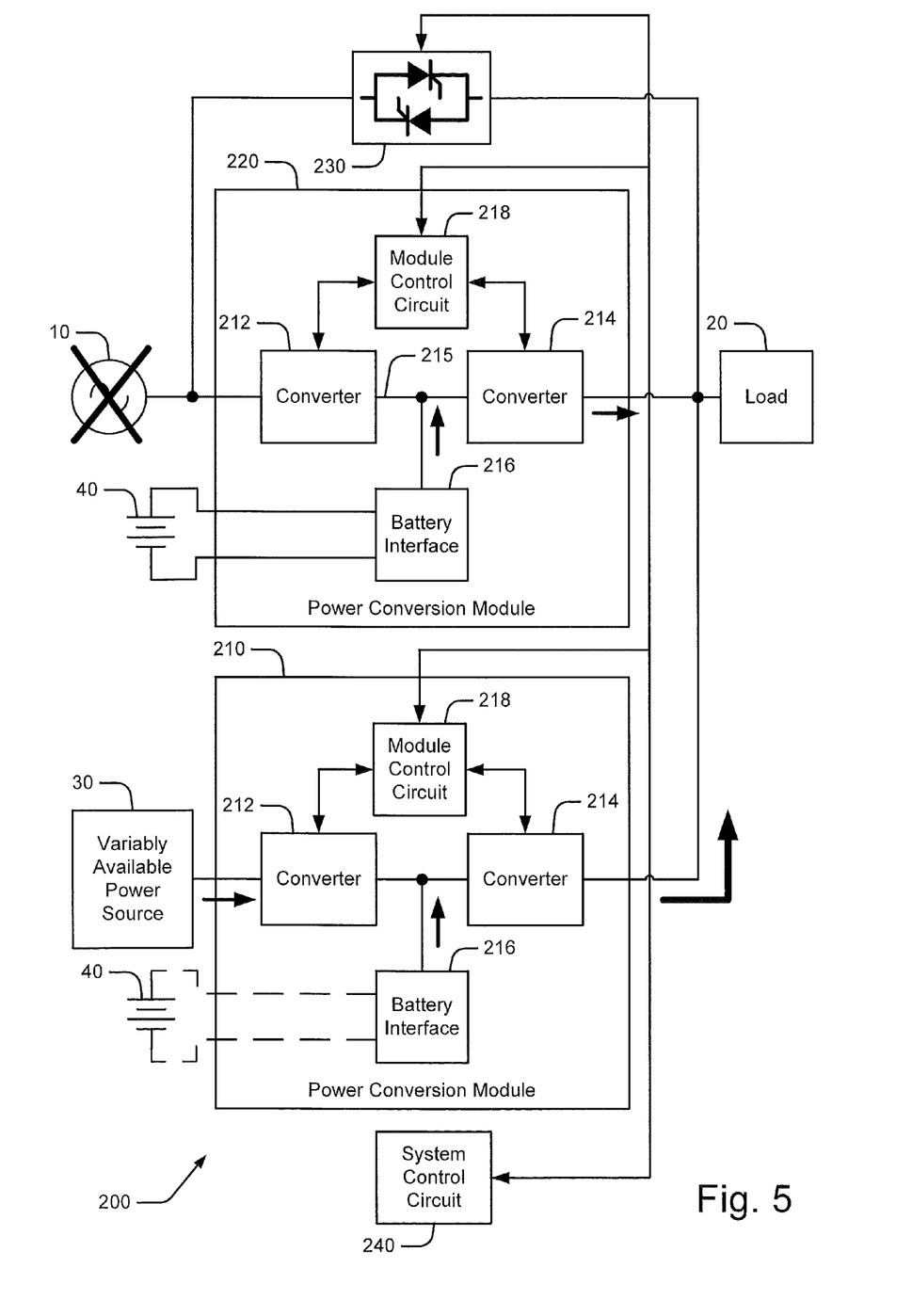

The control circuits of the UPS system 100 may support a plurality of operating modes. For example, as illustrated in FIG. 3, when the AC power source 10 is operating within normal limits such that the second power conversion module 220 may be bypassed, power may be concurrently delivered to the load 20 from the AC power source 10 and the variably available power source 30 via the bypass circuit 230 and the first power conversion module 210, respectively. In another mode illustrated in FIG. 4, when the bypass circuit 230 is opened and on-line conversion is performed by the second power conversion module 220, power may be concurrently delivered to the load 20 from the AC power source 10 and the variably available power source 30 via the second power conversion module 220 and the first power conversion module 210, respectively. As illustrated in FIG. 5, when the AC power source 10 fails, power may be delivered to the load 20 from the one or more batteries 40 coupled to the second power conversion module 220 and from the variably available power source 30 via the second power conversion module 220 and the first power conversion module 210, respectively. Additional power may be supplied by one or more batteries 40 coupled to the first power conversion module 210.

Figure 6:
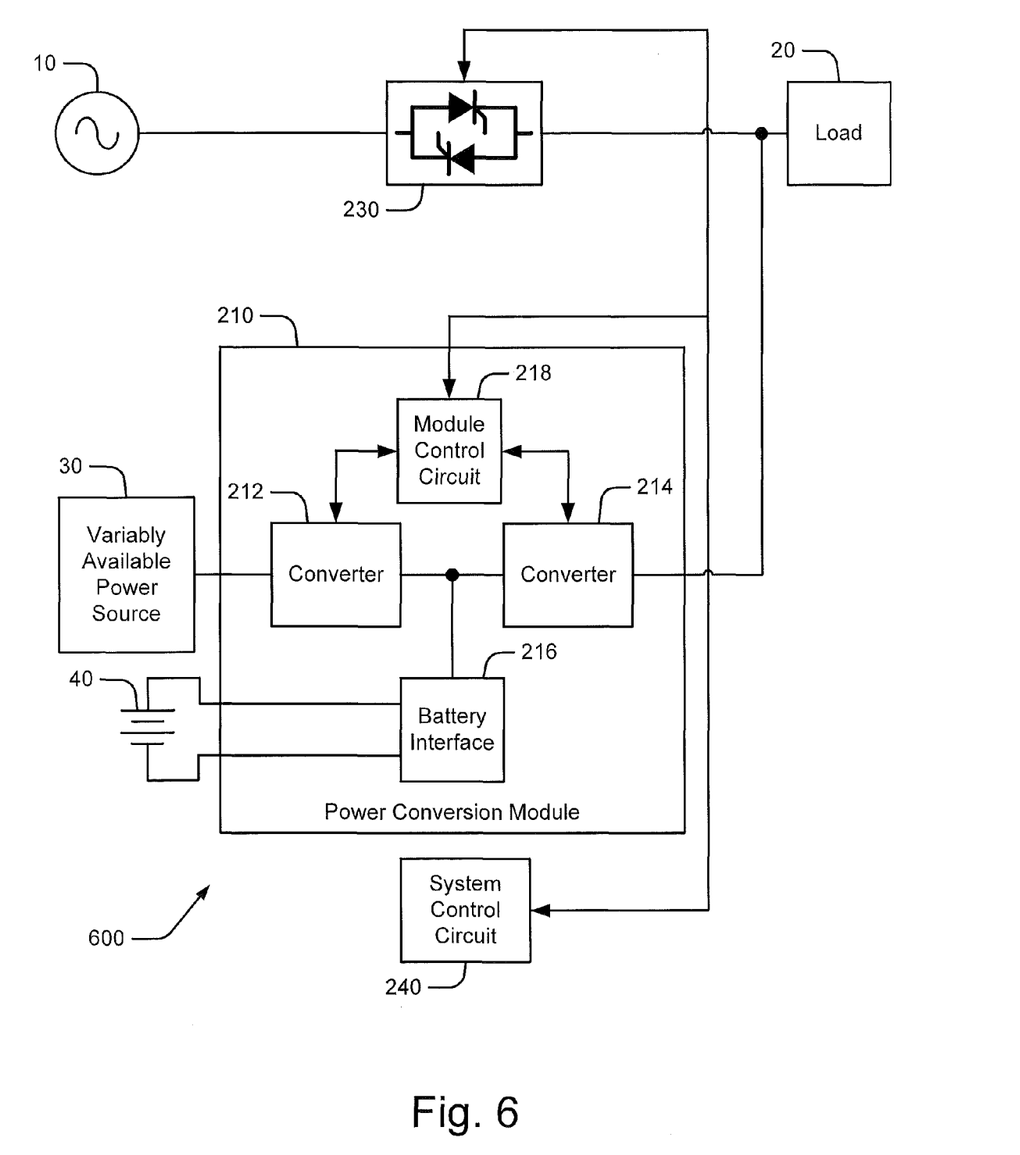
FIG. 6 is a schematic diagram illustrating a modular UPS system according to further embodiments of the inventive subject matter.

According to additional embodiments, similar functionality may be provided by coupling a power conversion module that receives power from a variably available source to the output of a static switch. FIG. 6 illustrates a UPS system 600 including a static switch 230 configured to couple and decouple an AC power source 10 to and from a load 20. A power conversion module 210 including components along the lines described above with reference to FIG. 2 is also coupled to the load 20 and is configured to transfer power from a variably available power source 30 to the load 20. One or more batteries 40 are coupled to the battery interface unit 216 of the power conversion module 210. The power conversion module 210 and the static switch 230 are cooperatively controlled by a system control circuit 240.

Figure 7:
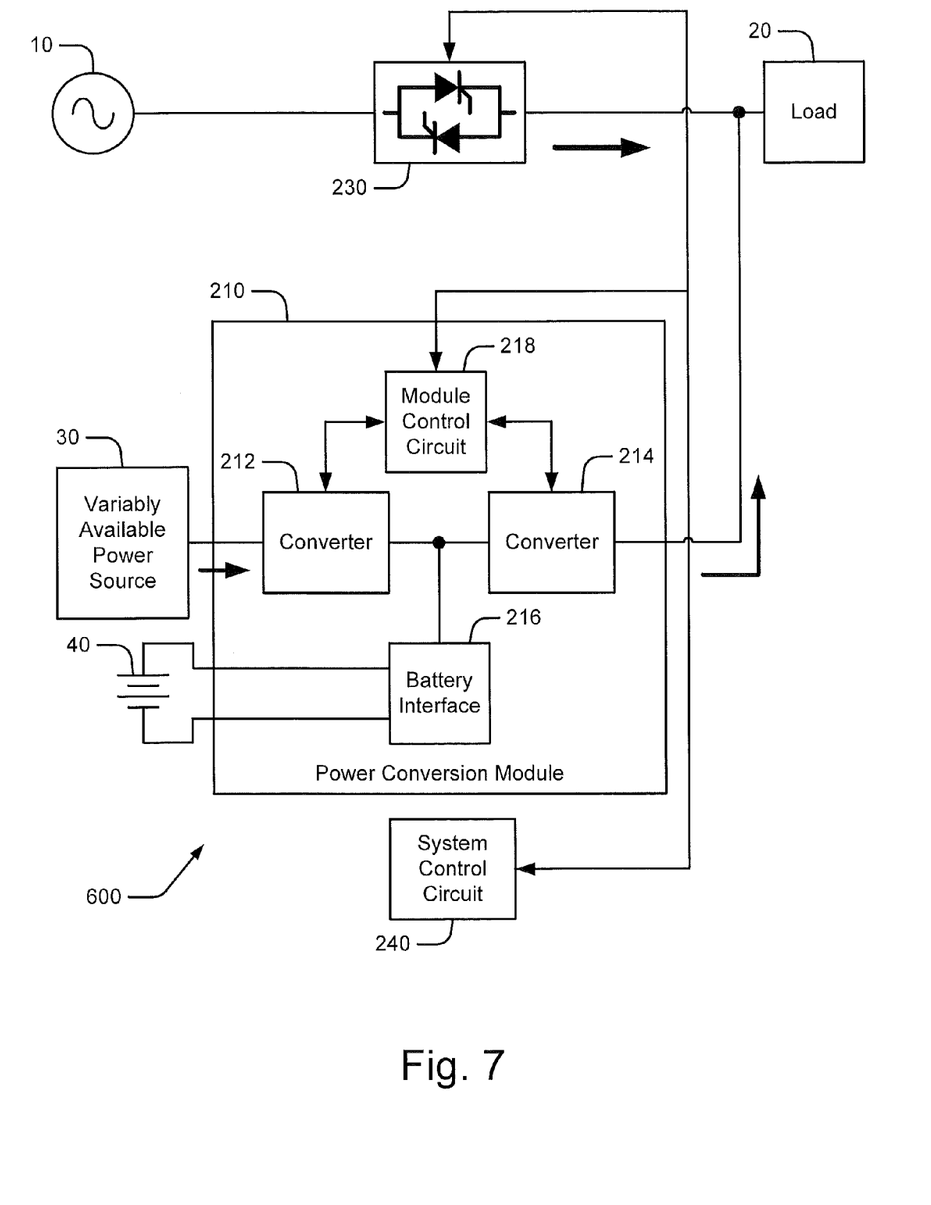
FIGS. 7 and 8 are schematic diagrams illustrating operations of the UPS system of FIG. 6.
Figure 8:
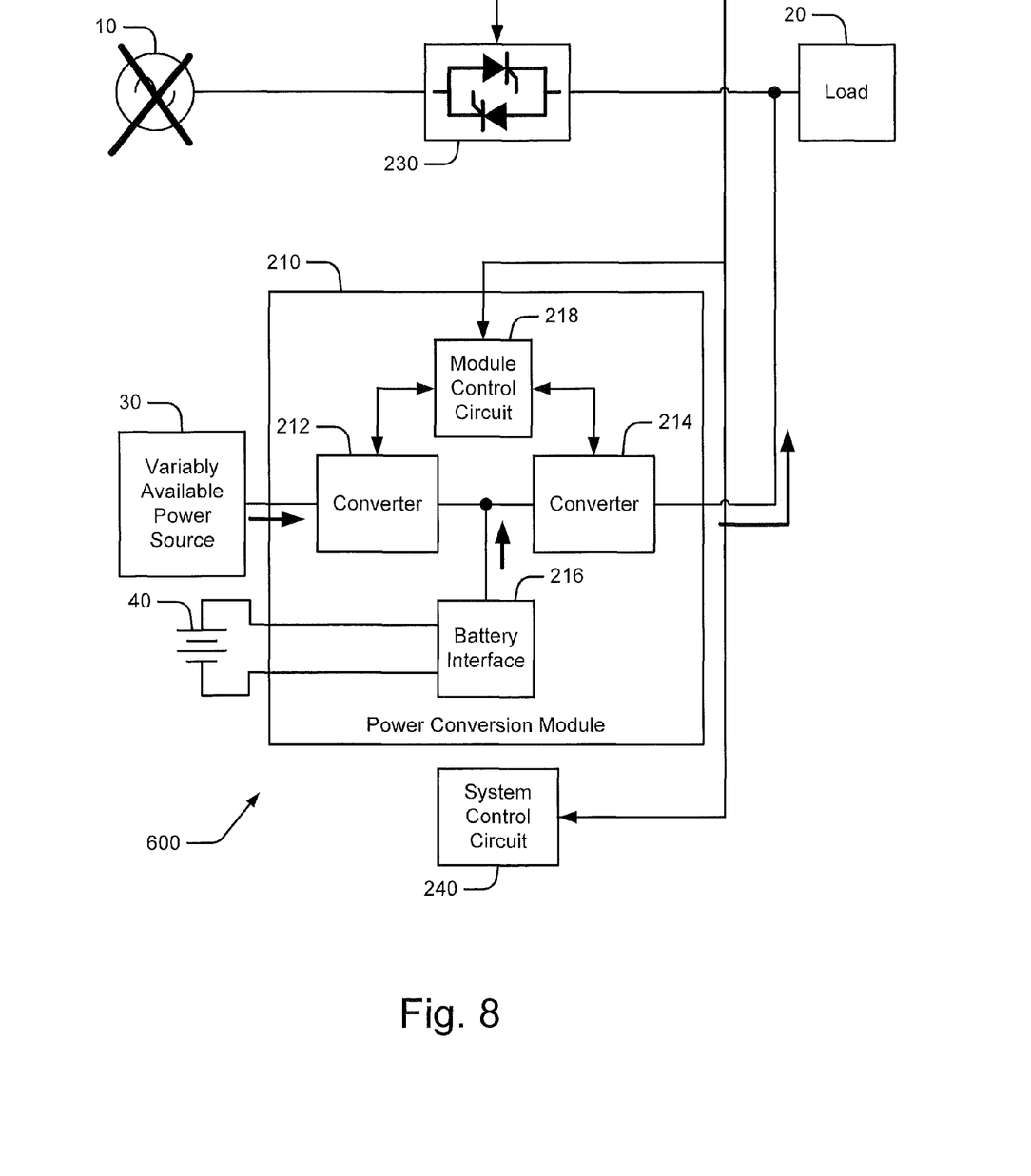

A shown in FIG. 7, when the AC power source 10 is in a normal condition, power may be concurrently supplied from the AC power source 10 and the variably available power source 30 via the static switch 230 and the power conversion module 210, respectively. As shown in FIG. 8, upon failure of the AC power source 10, power may be delivered to the load 20 from the variably available power source 30 and the one or more batteries 40 via the power conversion module 210.

In the drawings and specification, there have been disclosed exemplary embodiments of the inventive subject matter. Although specific terms are employed, they are used in a generic and descriptive sense only and not for purposes of limitation, the scope of the inventive subject matter being defined by the following claims.

That which is claimed:

1. An uninterruptible power supply (UPS) system, comprising:
   an AC input configured to be coupled to an AC power source;
   an AC output configured to be coupled to a load;
   a first power conversion circuit comprising a first converter circuit configured to receive power from a variably available power source, a second converter circuit coupled to the AC output, and a DC link coupling the first and second converter circuits;
   a second power conversion circuit comprising an AC/DC converter circuit coupled to the AC input, a DC/AC converter circuit coupled to the AC output and a DC link coupling the AC/DC converter circuit to the DC/AC converter circuit;
   a bypass circuit configured to selectively couple and decouple the AC input and the AC output; and
   a control circuit operatively associated with the first power conversion circuit, the second power conversion circuit and the bypass circuit and configured to cause concurrent transfer of power to a load at the AC output from the AC power source and the variably available power source via the bypass circuit and the first power conversion circuit, respectively.

2. The UPS system of claim 1, wherein the DC link of the second power conversion circuit is configured to receive power from an auxiliary power source and wherein the control circuit is configured to support a mode of operation in which the second power conversion circuit provides power to the load from the auxiliary power source responsive to a status of the AC power source.

3. The UPS system of claim 1, wherein the control circuit supports the following modes of operation:
   a mode in which power is concurrently transferred to the load from the AC power source and the variably available power source via the bypass circuit and the first power conversion circuit, respectively; and a mode in which power is concurrently transferred to the load from the variably available power source and an auxiliary power source coupled to the DC link of the first power conversion circuit.

4. The UPS system of claim 3, wherein the control circuit supports a mode in which power is concurrently transferred to the load from the AC power source and the variably available power source via the second power conversion circuit and the first power conversion circuit, respectively.

5. The UPS system of claim 3, wherein the DC links of the first and second power conversion circuits are configured to receive power from respective auxiliary power sources, wherein the control circuit supports a mode in which power is concurrently transferred to the load from the variably available power source and from the auxiliary power sources.

6. The UPS system of claim 1, wherein the first and second power conversion circuits are included in respective first and second power conversion modules, each of which comprises a converter unit selectively configurable to operate as a rectifier and a DC/DC converter.

7. The UPS system of claim 1, wherein the first converter unit of the first power conversion circuit is configured to operate as a DC/DC converter.

8. The UPS system of claim 1, wherein the DC link of the first power conversion circuit is isolated from the DC link of the second power conversion circuit.

9. The UPS system of claim 1, wherein the variably available power source comprises a wind power source and/or a solar power source.

10. A method of operating a UPS system comprising an AC input configured to be coupled to an AC power source, an AC output configured to be coupled to a load, a first power conversion circuit comprising a first converter circuit configured to receive power from a variably available power source, a second converter circuit coupled to the AC output, and a DC link coupling the first and second converter circuits, a second power conversion circuit comprising an AC/DC converter circuit coupled to the AC input, a DC/AC converter circuit coupled to the AC output and a DC link coupling the AC/DC converter circuit to the DC/AC converter circuit, a bypass circuit configured to selectively couple and decouple the AC input and the AC output and a control circuit operatively associated with the first power conversion circuit, the second power conversion circuit and the bypass circuit, the method comprising:

concurrently transferring power to a load at the AC output from the AC power source and the variably available power source via the bypass circuit and the first power conversion circuit, respectively.

11. The method of claim 10, wherein the DC link is configured to receive power from an auxiliary power source and further comprising providing power to the load from the auxiliary power source via the first power conversion circuit responsive to a status of the AC power source.

12. The method of claim 10, further comprising:

concurrently transferring power to the load from the AC power source and the variably available power source via the bypass circuit and the first power conversion circuit, respectively; and concurrently transferring power to the load from the variably available power source and an auxiliary power source coupled to the DC link of the first power conversion circuit.

13. The method of claim 12, further comprising concurrently transferring power to the load from the AC power source and the variably available power source via the second power conversion circuit and the first power conversion circuit, respectively.

14. The method of claim 12, wherein the DC links of the first and second power conversion circuits are configured to receive power from respective auxiliary power sources, and further comprising concurrently transferring power to the load from the variably available power source and from the auxiliary power sources.

15. The method of claim 10, wherein the first and second power conversion circuits are included in respective first and second power conversion modules, each of which comprises a converter unit selectively configurable to operate as a rectifier and a DC/DC converter.

16. The method of claim 10, comprising operating the first converter unit of the first power conversion circuit as a DC/DC converter.

17. The method of claim 10, wherein the DC link of the first power conversion circuit is isolated from the DC link of the second power conversion circuit.

18. The method of claim 10, wherein the variably available power source comprises a wind power source and/or a solar power source.

19. An uninterruptible power supply (UPS) system, comprising:

an AC input configured to be coupled to an AC power source;

an AC output configured to be coupled to a load;

a plurality of power conversion modules having a common architecture comprising first and second converter units coupled by a DC link, the plurality of power conversion modules comprising a first power conversion module having its first converter unit configured to receive power from a variably available power source, its second converter unit coupled to the AC output and a second power conversion module having its first converter unit coupled to the AC input and its second converter unit coupled to the AC output and its DC link configured to be coupled to an auxiliary power source;

a bypass circuit configured to selectively couple and decouple the AC input and the AC output; and a control circuit operatively associated with the plurality of power conversion modules and the bypass circuit and configured to cause concurrent transfer of power to a load at the AC output from the AC power source and the variably available power source via the bypass circuit and the first power conversion module, respectively.

20. The UPS system of claim 19, wherein the control circuit supports the following modes of operation:

a mode in which power is concurrently transferred to the load from the AC power source and the variably available power source via the bypass circuit and the first power conversion module, respectively; and a mode in which power is concurrently transferred to the load from the variably available power source and an auxiliary power source coupled to the DC link of the first power conversion module.

21. The UPS system of claim 20, wherein the control circuit supports a mode in which power is concurrently transferred to the load from the AC power source and the variably available power source via the second power conversion module and the first power conversion module, respectively.

22. An uninterruptible power supply (UPS) system, comprising:

an AC input configured to be coupled to an AC power source;

an AC output configured to be coupled to a load;

a first converter circuit having an input configured to receive power from a variably available power source and a second converter circuit coupled to an output of the first converter circuit by a DC link and having an output coupled to the AC output;

an on-line UPS coupled between the AC input and the AC output;

a bypass circuit configured to selectively couple and decouple the AC input and the AC output to bypass the on-line UPS; and a control circuit operatively associated with the first and second converter circuits, the on-line UPS and the bypass circuit and configured to cause concurrent transfer of power to a load at the AC output from the AC power source via the bypass circuit and from the variably available power source via the first and second converter circuits.

23. The UPS system of claim 22, wherein the first and second power converter circuits are implemented in a first power conversion module and wherein the on-line UPS is implemented in a second power conversion module and wherein the first and second power conversion modules have a common converter architecture.

24. The UPS system of claim 23, wherein the first converter circuit is capable of operating as a DC/DC converter and an AC/DC converter.

* * * * *